(12) United States Patent
Delage et al.

(10) Patent No.: US 9,133,899 B2
(45) Date of Patent: Sep. 15, 2015

(54) ENERGY-ABSORBING ELEMENT AND RELATED PRETENSIONING FLANGE

(75) Inventors: Vincent Delage, Thizay (FR); Catherine Sibottier, Gievres (FR); Julien Dhermand, Neuvy Pailloux (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 125 days.

(21) Appl. No.: 13/581,339

(22) PCT Filed: Mar. 1, 2011

(86) PCT No.: PCT/FR2011/050424
§ 371 (c)(1),
(2), (4) Date: Oct. 31, 2012

(87) PCT Pub. No.: WO2011/107706
PCT Pub. Date: Sep. 9, 2011

(65) Prior Publication Data
US 2013/0038007 A1     Feb. 14, 2013

(30) Foreign Application Priority Data

Mar. 1, 2010    (EP) .................................... 10305209

(51) Int. Cl.
F16F 1/12      (2006.01)
F16F 3/02      (2006.01)
F16F 1/13      (2006.01)

(52) U.S. Cl.
CPC ... *F16F 3/02* (2013.01); *F16F 1/13* (2013.01); *F16F 2228/08* (2013.01); *F16F 2236/06* (2013.01)

(58) Field of Classification Search
CPC ................. F16F 1/02; F16F 1/18; F16F 1/26; F16F 1/32; F16F 1/368; F16F 3/02
USPC .......... 267/179, 165, 160, 164, 145, 103, 158
See application file for complete search history.

(56) References Cited

U.S. PATENT DOCUMENTS 1,433,201 A     10/1922    Grant
2,219,001 A  *  10/1940    Woodman ..................... 267/204
(Continued)

FOREIGN PATENT DOCUMENTS

BE          646747 A      8/1964
CN       101195351 A      6/2008
(Continued)

OTHER PUBLICATIONS

International Search Report dated Jun. 24, 2011 in Application No. PCT/FR2011/050424.

*Primary Examiner* — Anna Momper
*Assistant Examiner* — San Aung
(74) *Attorney, Agent, or Firm* — Brooks Kushman P.C.

(57) ABSTRACT

The invention essentially relates to an energy-absorbing element (1') comprising:
an absorbing portion (2),
a first (3) and second anchoring point (4),
a first (2') and second (2") distal ends of said absorbing portion (2) being respectively secured to the first and second anchoring points (3, 4),
characterized in that it also comprises:
a pretensioning flange (12) installed between the first (2') and second (2") distal ends, the length (L) of said flange (12) exceeding the gap (E) between the two distal ends (2', 2") in order to pretension said absorbing element.

11 Claims, 2 Drawing Sheets

(56) References Cited

U.S. PATENT DOCUMENTS

| | | | |
|---|---|---|---|
| 3,056,596 A * | 10/1962 | Moisson, Jr. | 267/141 |
| 3,198,288 A | 8/1965 | Presunka | |
| 3,291,525 A | 12/1966 | Fritzmeier | |
| 3,326,603 A | 6/1967 | Lehner | |
| 3,425,318 A * | 2/1969 | Whitehill | 89/42.01 |
| 3,447,833 A | 6/1969 | Rice | |
| 3,482,872 A | 12/1969 | Chamberlain | |
| 3,572,828 A | 3/1971 | Lehner | |
| 3,724,603 A | 4/1973 | Shiomi et al. | |
| 3,737,155 A * | 6/1973 | Karlan | 267/136 |
| 3,985,388 A | 10/1976 | Hogan | |
| 4,662,597 A | 5/1987 | Uecker et al. | |
| 4,832,320 A * | 5/1989 | Scowen et al. | 267/227 |
| 4,838,514 A | 6/1989 | Hill | |
| 5,125,598 A | 6/1992 | Fox | |
| 5,176,356 A | 1/1993 | Lorbiecki et al. | |
| 5,368,358 A * | 11/1994 | Christensen | 297/215 |
| 5,788,185 A | 8/1998 | Hooper | |
| 5,842,669 A | 12/1998 | Ruff | |
| 6,427,990 B1 * | 8/2002 | Hartmann | 267/158 |
| 6,767,057 B2 | 7/2004 | Neelis | |
| 7,520,555 B2 | 4/2009 | Malapati et al. | |
| 7,775,479 B2 | 8/2010 | Benthien | |
| 8,087,723 B2 | 1/2012 | Honnorat et al. | |
| 8,562,075 B2 | 10/2013 | Honnorat et al. | |
| 2004/0051356 A1 | 3/2004 | Neelis | |
| 2007/0029444 A1 | 2/2007 | Mercier et al. | |
| 2007/0267792 A1 * | 11/2007 | Elmoselhy | 267/195 |
| 2009/0200721 A1 * | 8/2009 | Kobelev et al. | 267/195 |
| 2009/0267391 A1 * | 10/2009 | Honnorat et al. | 297/216.17 |
| 2010/0301531 A1 * | 12/2010 | Delahousse et al. | 267/165 |
| 2011/0079681 A1 | 4/2011 | Honnorat | |
| 2011/0147562 A1 | 6/2011 | Auger et al. | |

FOREIGN PATENT DOCUMENTS

| | | |
|---|---|---|
| DE | 10026178 A1 | 2/2001 |
| EP | 0078479 A1 | 5/1983 |
| EP | 0814020 A2 | 12/1997 |
| EP | 0927659 A2 | 7/1999 |
| EP | 2113677 A1 | 11/2009 |
| FR | 2965177 A1 | 3/1994 |
| GB | 497008 A | 12/1938 |
| GB | 1077322 A | 7/1967 |
| GB | 2269647 A | 2/1994 |
| GB | 2444591 A | 6/2006 |

* cited by examiner

ENERGY-ABSORBING ELEMENT AND RELATED PRETENSIONING FLANGE

CROSS REFERENCE TO RELATED APPLICATIONS

This application is the U.S. national phase of International Application No. PCT/FR2011/050424 filed on Mar. 1, 2011, which application claims priority to European Patent Application No. 10305209.8 filed on Mar. 1, 2010, the contents of both of which are incorporated herein by reference.

TECHNICAL FIELD OF THE INVENTION

The invention relates to an improved energy-absorbing element and its related pretensioning flange. The invention is particularly advantageous, however not exclusive, to the manufacture of helicopter seats.

PRIOR ART

FIG. 1 shows an energy-absorbing element 1 described in the document EP 2113677 equipped with an absorbing portion 2, a first anchoring point 3 and a second anchoring point 4, a first and second distal ends 2', 2" of said absorbing portion 2 being respectively secured to the first and second anchoring points 3, 4.

The absorbing portion 2 comprises at least one solid filiform element 5, 6 which is elastically deformed under tensile forces not exceeding a predetermined threshold and which is plastically deformed under tensile forces exceeding said predetermined threshold, said at least one filiform element 5, 6 being equipped with a succession of straight segments 7, 8, 9 and arc-shaped segments 10 so as to have at least two successive straight segments connected by an arc-shaped segment 10.

PURPOSE OF THE INVENTION

The invention has the particular purpose of improving the performance levels of this absorbing element.

For this purpose, the invention involves pretensioning the energy-absorbing element throughout its length using a suitable tool, then inserting a flange maintaining its pretensioned state.

The invention therefore relates to an energy-absorbing element comprising:
 an absorbing portion,
 a first and second anchoring point,
 a first and second distal ends of said absorbing portion being respectively secured to the first and second anchoring points,
 characterised in that it also comprises:
 a pretensioning flange installed between the first and second distal ends, the length of said flange exceeding the gap between the two distal ends in order to pretension said absorbing element.

According to one embodiment, the absorbing portion is formed by two solid filiform elements capable of becoming elastically deformed under tensile forces not exceeding a predetermined threshold and becoming plastically deformed under tensile forces exceeding said predetermined threshold, with the flange being installed between these two filiform elements.

According to one embodiment, the pretensioning flange is positioned along an axis of symmetry of the absorbing element.

According to one embodiment, the thickness of the flange is dependent on the compressive forces exerted by the absorbing portion on the flange.

According to one embodiment, the length of the flange is dependent on the level of pretensioning required by the absorbing portion for the desired functioning.

The invention also relates to a flange intended for use with the absorbing element according to the invention, characterised in that it has the substantial shape of a lengthened rod comprising ends, each with two edges defining a basin for receiving the distal ends of the absorbing element.

BRIEF DESCRIPTION OF THE FIGURES

The invention will be better understood after reading the following description and after examining the accompanying figures. These figures are intended for purposes of illustration only and are not intended to limit the scope of the invention. They show.

The identical elements are referred to by the same reference in each figure.

DESCRIPTION OF EXAMPLES OF EMBODIMENT OF THE INVENTION

Figure 2:
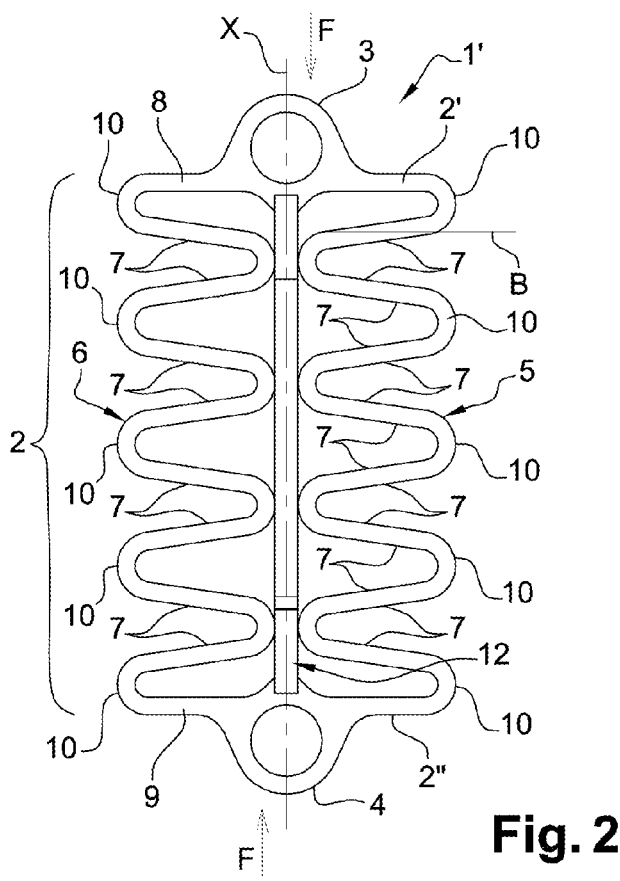
FIG. 2: a schematic representation of an improved absorbing element according to the invention and a longitudinal cross-section of the flange according to the invention.
Figure 2:
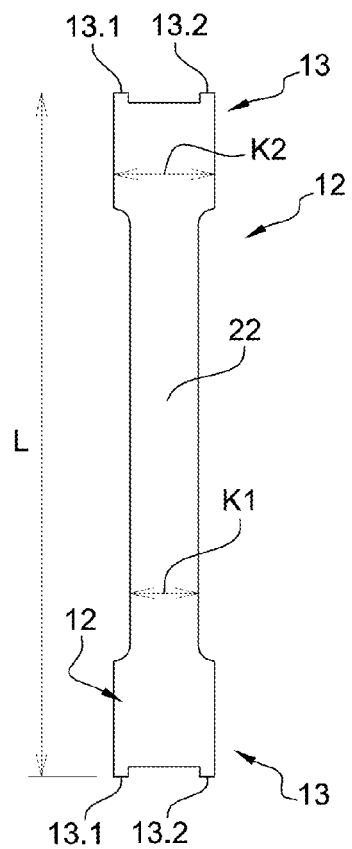

FIG. 2 shows an improved energy-absorbing element 1' according to the invention, particularly suited to the construction of helicopter seats.

This element 1' is equipped with an absorbing portion 2, a first anchoring point 3 and a second anchoring point 4, a first and second distal ends 2', 2" of said absorbing portion 2 being respectively secured to the first and second anchoring points 3, 4.

The absorbing portion 2 comprises two solid filiform elements 5, 6 which are elastically deformed under tensile forces not exceeding a predetermined threshold and which are plastically deformed under tensile forces exceeding said predetermined threshold.

Said filiform elements 5, 6 are equipped with a succession of straight segments 7, 8, 9 and arc-shaped segments 10 so as to have at least two successive straight segments connected by an arc-shaped segment 10.

A pretensioning flange 12 is installed between the first 2' and second 2" distal ends respectively corresponding to the straight segments 8 and 9 of the element 1' the furthest away from each other. The flange 12 is also positioned between the two filiform elements 5, 6.

Preferably, the flange 12 is positioned at the centre of the energy-absorbing element 1, i.e. it is positioned along an axis of symmetry X of the absorbing element 1'.

The length L of this flange 12 exceeds the gap E between the two distal ends 2', 2" so as to pretension said absorbing element 1'. This gap E corresponds to the distance separating the straight segments of the ends 8 and 9 when the element 1 is not pretensioned.

As shown by the longitudinal cross-section in FIG. 2, the flange 12 has the substantial shape of a lengthened rod with ends 13 ending in two blocking elements. These blocking elements are designed to hold the energy-absorbing element 1' in position without the risk of the latter becoming deformed.

For this purpose, the blocking elements are each formed by two edges 13.1, 13.2 defining a basin for receiving the distal ends 2', 2" of the absorbing element 1', the edges 13.1, 13.2 being intended to rest against the sides of the distal ends 2', 2" in order to limit the possible movement of the flange 12 along a direction perpendicular to the longitudinal direction of the absorbing element 1'.

FIG. 2 also shows that the thickness K1 of the portion 22 of the flange 12 which extends between the two ends 13 does not exceed the thickness K2 of each of the ends 13.

The flange 12 is designed so as not to buckle under the forces exerted by the energy-absorbing element 1'. Therefore, the thickness K1 of the flange 12 is dependent on the compressive forces exerted by the energy-absorbing element 1 on the flange 12.

Furthermore, the length L of the flange 12 is dependent on the level of pretensioning required by the energy-absorbing element 1 for the desired functioning.

The flange 12 is maintained by the compressive forces F exerted by the energy-absorbing element, which tends to want to return to the position in which the element is not pretensioned.

Figure 1:
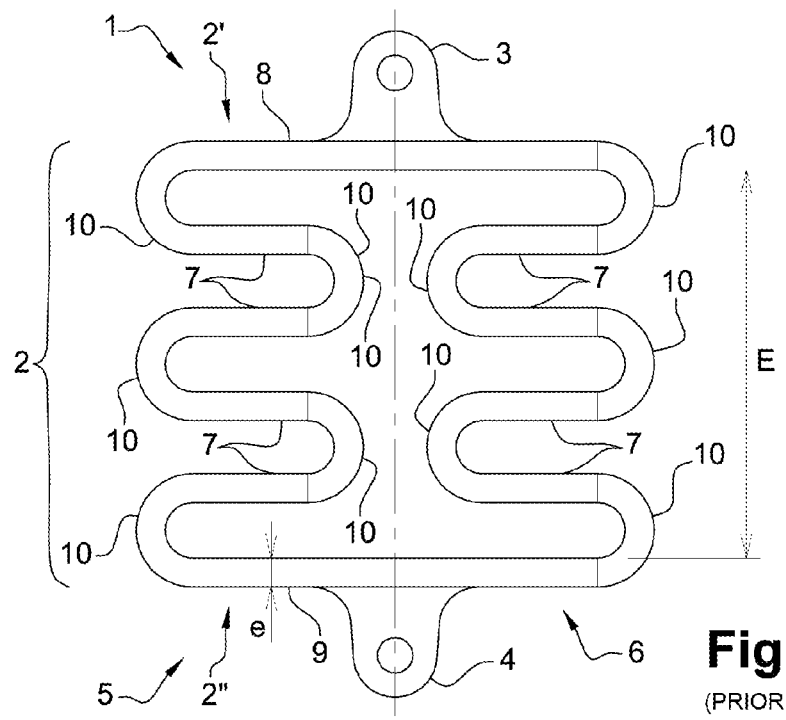
FIG. 1: a schematic representation of an energy-absorbing element according to the prior art.

The straight segments 7, 8, 9 are substantially parallel to each other when no pretensioning force is applied by the flange 12 on the absorbing element (refer to FIG. 1), and form a slight angle with a direction B perpendicular to the longitudinal direction of the flange 12 when the element is pretensioned by the flange (refer to FIG. 2). The direction B is located along a plane in which the filiform elements 5, 6 extend.

It should be noted that the anchoring points 3 and 4 perform the same functions as for a non-pretensioned energy-absorbing element 1.

Figure 3:
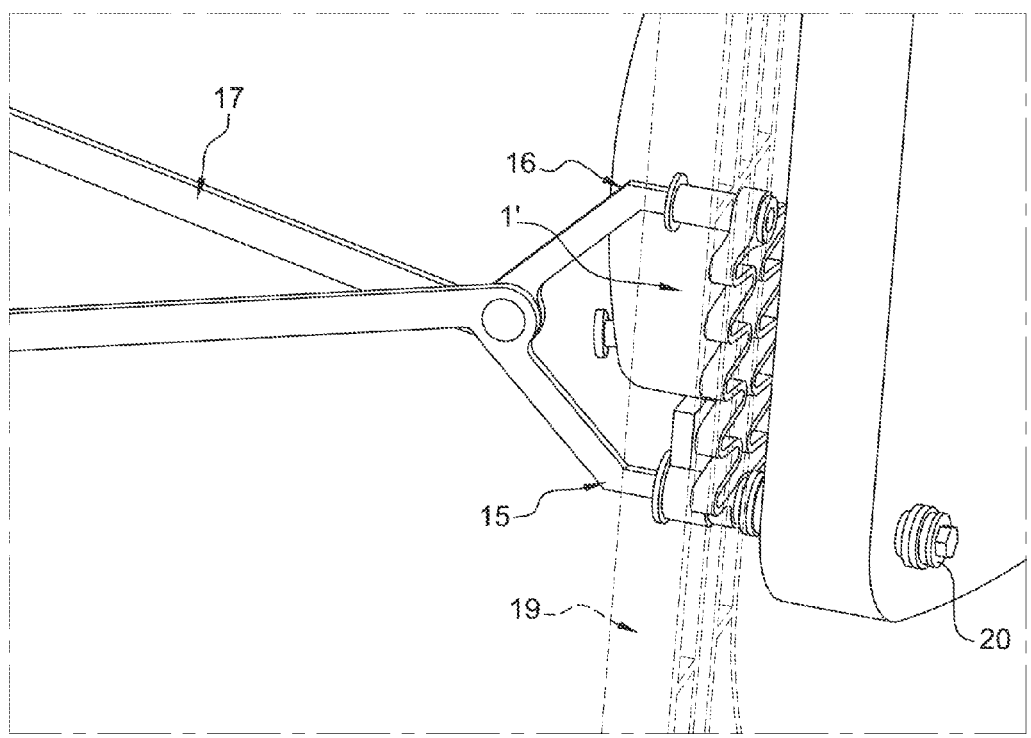
FIG. 3: a schematic representation of a tool according to the invention for pretensioning the absorbing element in FIG. 1 so as to insert the flange according to the invention.

As shown in FIG. 3, a helicopter seat comprises an upright 19 designed to integrate two pins 15, 16 cooperating with the anchoring points 3, 4 of the energy-absorbing element 1'. More precisely, the pin 16 is a fixed pin cooperating with the anchoring point 3. The pin 15 is a mobile pin sliding within a guideway of the upright 19, this pin 15 being connected to a bucket with reference 20.

After having assembled all elements comprising the seat, the method consists in pretensioning the energy-absorbing element 1' using a specialised tool 17 with the aim of inserting a flange 12 into the guideway of the upright 19 blocking the mobile pin 15 in position.

Once assembled onto the seat, the pins 15 and 16 have the characteristic of being able to adapt on the specialised tool 17 to exert a pretensioning force in order to perform the installation step for the pretensioning flange 12.

The advantage associated with pretensioning the flange 12 involves improving the performance levels of the energy-absorbing element 1 according to the prior art, in particular in its applications described in the document EP-2113677.

The invention claimed is:

1. An energy-absorbing element comprising:
   an absorbing portion having two filiform elements oriented symmetrically about an axis of symmetry, each deformable filiform element having at least two successive straight segments connected by an arc-shaped segment;
   a first and second anchoring point;
   a first and second distal ends of the absorbing portion being respectively secured to the first and second anchoring points, and
   a solid pre-tensioning rod installed between the first and second distal ends along the axis of symmetry, the length of the pre-tensioning rod maintains the absorbing portion in an extended position thereby elastically deforming the absorbing portion and defining a gap dimension between the two distal ends in order to pretension the energy absorbing element such that the gap dimension between the two distal ends when the energy-absorbing element is not pre-tensioned is less than the length of the pre-tensioning rod,
   wherein the pre-tensioning rod is configured not to buckle under compressive forces exerted on the energy absorbing element and the pre-tensioning rod applies a tensile force to the absorbing portion equal to a predetermined threshold,
   wherein the absorbing portion plastically deforms when the absorbing portion experiences tensile forces above the predetermined threshold.

2. The absorbing element according to claim 1, wherein the thickness of the rod is dependent on the compressive forces exerted by the absorbing portion on the rod to ensure the rod does not buckle.

3. The absorbing element according to claim 1, wherein pre-tensioning rod includes ends, each with two edges defining a basin for receiving the distal ends of the absorbing portion.

4. The absorbing element according to claim 1, wherein the absorbing portion is connected to the first and second distal ends thereby forming a single-piece continuous loop.

5. An energy absorbing element comprising:
   first and second primary segments;
   first and second anchor points fixedly secured to the first and second primary segments respectively; and
   two energy absorbing portions oriented symmetrically about a longitudinal axis of symmetry and connecting the first and second primary segments in an elevation direction, each of the energy absorbing portions having a filiform shape formed by a plurality of straight-line segments each connected by an arcuate segment, the straight-line segments oriented at a pre-tensioned angle to one another;
   a solid pre-tensioning rod inserted between the first and second primary segments along the axis of symmetry, wherein the length of the rod maintains the plurality of straight-line segments in an extended position thereby elastically deforming the energy absorbing portions to define the pre-tensioned angle,
   wherein the pre-tensioning rod is configured not to buckle under compressive forces exerted on the energy absorbing element and the pre-tensioning rod applies a pretension force to the energy absorbing portions equal to a predetermined threshold,
   wherein the energy absorbing portions deform plastically when a tensile force above the predetermined threshold is exerted on the first and second anchor points.

6. The absorbing element according to claim 5, wherein the two energy absorbing portions are connected to the first and second primary segments thereby forming a single-piece continuous loop.

7. The absorbing element according to claim 5 wherein the two energy absorbing portions are mirror images of each other and disposed symmetrically about the longitudinal axis of symmetry being parallel to the elevation direction.

8. The absorbing element according to claim 5, wherein pre-tensioning rod includes two basins for receiving each of the primary segments of the absorbing element.

9. An energy absorbing element comprising:
an energy absorber including:
- first and second primary straight-line segments defining first and second distal ends of the energy absorber;
- two energy absorbing connection portions oriented symmetrically about a longitudinal axis of symmetry and connecting the first and second primary segments in an elevation direction, each of the connection portions having an undulating filiform shape formed by a plurality of straight-line segments each connected by an arcuate segment, the straight-line segments oriented at a non-parallel pre-tensioned angle to one another and to the primary segments,
- wherein the two energy absorbing portions are each connected to the first and second primary segments to define the energy absorber as a single-piece continuous loop;

first and second anchor points fixedly secured to the first and second distal ends respectively; and
a solid pre-tensioning rod inserted between the first and second primary straight line segments along the axis of symmetry, wherein the length of the rod extends and maintains the plurality of straight-line segments of the energy absorbing portions in an extended position thereby elastically deforming the energy absorbing portions to define the pre-tensioned angle, wherein the pre-tensioning rod is configured not to buckle under compressive forces exerted on the energy absorbing element and the pre-tensioning rod applies a pretension force to the energy absorbing portions equal to a predetermined threshold, wherein the energy absorber deforms plastically when a tensile force above the predetermined threshold is exerted on the first and second anchor points.

10. The absorbing element according to claim 9 wherein the two energy absorbing portions are mirror images of each other and disposed symmetrically about the longitudinal axis of symmetry being parallel to the elevation.

11. The absorbing element according to claim 9, wherein pre-tensioning rod includes two basins for receiving each of the primary segments of the energy absorber.

* * * * *